(12) United States Patent
Mueller et al.

(10) Patent No.: US 9,026,108 B2
(45) Date of Patent: May 5, 2015

(54) METHOD, PUBLIC LAND MOBILE NETWORK AND REQUESTING ENTITY

(75) Inventors: Manfred Mueller, Dornstadt (DE); Maik Kirsch, Sankt Augustin (DE)

(73) Assignee: Deutsche Telekom AG, Bonn (DE)

( * ) Notice: Subject to any disclaimer, the term of this patent is extended or adjusted under 35 U.S.C. 154(b) by 52 days.

(21) Appl. No.: 13/822,038

(22) PCT Filed: Sep. 12, 2011

(86) PCT No.: PCT/EP2011/004574
§ 371 (c)(1),
(2), (4) Date: Mar. 11, 2013

(87) PCT Pub. No.: WO2012/034674
PCT Pub. Date: Mar. 22, 2012

(65) Prior Publication Data
US 2013/0178186 A1     Jul. 11, 2013

Related U.S. Application Data

(60) Provisional application No. 61/383,968, filed on Sep. 17, 2010.

(30) Foreign Application Priority Data

Sep. 17, 2010   (EP) .................................. 10009829

(51) Int. Cl.
*H04W 4/00*      (2009.01)
(Continued)

(52) U.S. Cl.
CPC *H04W 4/22* (2013.01); *H04W 8/08* (2013.01); *H04W 76/02* (2013.01); *H04W 84/042* (2013.01); *H04W 88/14* (2013.01); *H04W 88/16* (2013.01)

(58) Field of Classification Search
CPC ..... H04W 8/04; H04W 84/045; H04W 64/00; H04W 92/02; H04W 92/12; H04W 84/042; H04W 4/22; H04W 76/028; H04W 92/045; H04W 92/10; H04W 4/00
USPC .................................................. 455/404, 430
See application file for complete search history.

(56) References Cited

U.S. PATENT DOCUMENTS 5,819,178 A * 10/1998 Cropper ........................ 455/433
6,408,181 B1    6/2002 Ho et al.
(Continued)

FOREIGN PATENT DOCUMENTS

KR    1020070114445    * 12/2007
WO    WO 9747153 A1    12/1997

OTHER PUBLICATIONS

European Patent Office, International Search Report of Application No. PCT/EP2011/004574.

*Primary Examiner* — Lester Kincaid
*Assistant Examiner* — Gary Lafontant
(74) *Attorney, Agent, or Firm* — Leydig, Voit & Mayer, Ltd.

(57) ABSTRACT

A method for providing an emergency functionality when setting up a call directed to a User Equipment in a public land mobile network, the public land mobile network having a home database and a visitor database, includes, in case of the occurrence of a mobile terminating call towards the User Equipment: requesting, by a requesting entity, that the home database provide information specific to the User Equipment to the requesting entity; and in case of a failure of the functionality of the home database, requesting, by the requesting entity, that the visitor database provide the information specific to the User Equipment.

9 Claims, 1 Drawing Sheet

(51) Int. Cl.
*H04W 4/22* (2009.01)
*H04W 8/08* (2009.01)
*H04W 76/02* (2009.01)
*H04W 84/04* (2009.01)
*H04W 88/14* (2009.01)
*H04W 88/16* (2009.01)

(56) References Cited

U.S. PATENT DOCUMENTS

| | | |
|---|---|---|
| 8,208,940 B2 * | 6/2012 | Noldus et al. .............. 455/456.1 |
| 2004/0087305 A1 * | 5/2004 | Jiang et al. ................. 455/432.1 |
| 2007/0184822 A1 * | 8/2007 | Huotari ........................ 455/415 |

* cited by examiner

METHOD, PUBLIC LAND MOBILE NETWORK AND REQUESTING ENTITY

CROSS-REFERENCE TO RELATED APPLICATIONS

This application is a U.S. National Phase application under 35 U.S.C. §371 of International Application No. PCT/EP2011/004574, filed on Sep. 12, 2011, and claims benefit to U.S. Provisional Application No. 61/383,968, filed Sep. 17, 2010, and European Patent Application No. EP 10009829.2, filed on Sep. 17, 2010. The International Application was published in English on Mar. 22, 2012 as WO 2012/034674 A1 under PCT Article 21(2).

FIELD

The present invention relates to a method for providing an emergency functionality when setting up a call directed to a User Equipment in a public land mobile network. Furthermore, the present invention relates to a public land mobile network and to a requesting entity.

BACKGROUND

In various cellular radio or mobile radio systems presently in use or being developed, the geographical coverage area of the system is divided into smaller separate radio areas or cells in such a way that when the mobile radio is in a cell, it communicates over the line based network and a radio station (base station) located in the cell. Mobile radios belonging to the system are free to roam from one cell to another within the area of the system. An example of such systems is the digital mobile radio system GSM (Global System for Mobile Communications). When a subscriber in the same system or in an external system wants to call a mobile radio or a mobile subscriber Mobile Station (MS) in this kind of cellular system, the network has to know the actual location of the mobile radio MS in order to be able to route the call to the right mobile services switching center (MSC). In the GSM system, for example, the number selected by a calling subscriber contains no information on the actual location of the called MS. Therefore, to set up the connection, it is necessary to determine the location of the MS by utilizing a routing address, i.e. the mobile station roaming number. In the GSM system, this information can be provided solely by the home location register (HLR), which is a database in which subscriber data, such as location data, are stored permanently. Therefore, in order to be able to route the call to the MSC within the area of which the MS is currently located, it is necessary to send a request to the HLR. In the GSM system, each location area consisting of several radio cells comprises a visitor location register VLR, which is a database in which subscriber data are stored while the subscriber visits the area of the VLR. The VLR gives the HLR the information required for routing calls to the MS and participates e.g. in the switching of calls in the MSC. In case of a mobile terminated call towards a mobile station being set up, the Mobile Switching Center (MSC) requests (from the Home Location Register) information that are specific of the mobile station. The HLR forwards the roaming number provided by the VLR to the requesting Mobile Switching Center (MSC), and so the Mobile Switching Center (MSC) routes the call to the right MSC on the basis of the roaming number. After the call has been routed up to the MSC, the MSC initiates a mobile radio paging procedure and, after finding the MS, the MSC establishes a radio link with the MS through this radio station and sets up the call.

SUMMARY

In an embodiment, the present invention provides a method for providing an emergency functionality when setting up a call directed to a User Equipment in a public land mobile network. The public land mobile network includes a home database for permanently storing location and subscriber data concerning the User Equipment registered with the public land mobile network. The geographical coverage area of the public land mobile network is divided into a plurality of smaller service areas. A first service area of the plurality of service areas is served by a visitor database of the public land mobile network. The visitor database is provided for temporarily storing subscriber data concerning the User Equipment currently located within the first service area. The method includes, in case of the occurrence of a mobile terminating call towards the User Equipment: requesting, by a requesting entity, that the home database provide information specific to the User Equipment to the requesting entity; and in case of a failure of the functionality of the home database, requesting, by the requesting entity, that the visitor database provide the information specific to the User Equipment.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
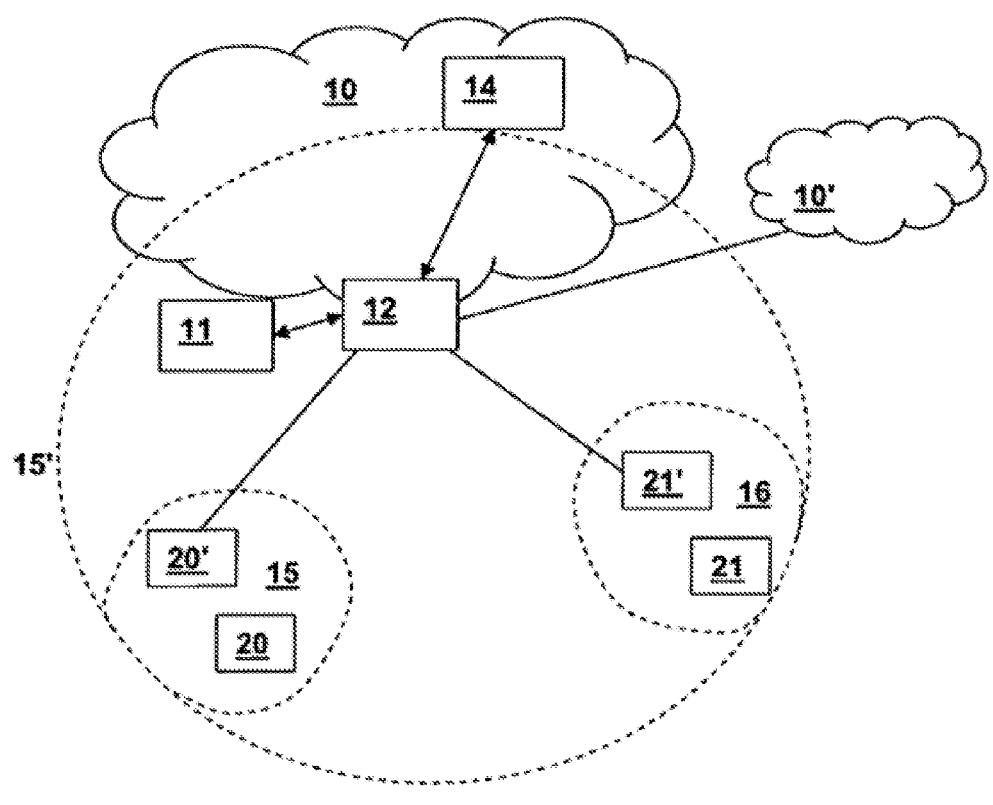
FIG. 1 schematically illustrates a cellular public land mobile network comprising at least one service area comprising a plurality of radio cells.

In an embodiment, the present invention provides an emergency mode for the public land mobile network in such situation where the Home Location Register is not available to the requesting entity to provide the requested information, e.g. in the case of a failure of the Home Location Register or in case of an error in the accessibility of the Home Location Register (e.g. due to a transmission link break-down).

In an embodiment, a method provides an emergency functionality when setting up a call directed to a User Equipment in a public land mobile network. The public land mobile network comprises a home database for permanently storing location and subscriber data concerning the User Equipment registered in the public land mobile network. The geographical coverage area of the public land mobile network is divided into a plurality of smaller service areas, wherein one such service area out of the plurality of service areas is served by a visitor database of the public land mobile network, wherein the visitor database is provided for temporarily storing subscriber data concerning the User Equipment currently located within the one service area out of the plurality of service areas, wherein in case of the occurrence of a mobile terminating call towards the User Equipment:

the home database is requested by a requesting entity to provide information specific of the User Equipment to the requesting entity, and wherein in case of a failure of the functionality of the home database, the requesting entity requests the visitor database for the information specific of the User Equipment.

According to the present invention, it is advantageously possible that at least partly one important network functionality (namely the ability to route incoming telephone calls) is preserved even in case that the home database is not available (or that a failure occurs with respect to the home database). The partial network functionality refers to situations where a call has to be routed such that a plurality of different smaller service areas (comprising each a visitor database) are involved. If this is the case, then the home database is usually required to provide certain information (e.g. the location of User Equipments or mobile stations in other smaller service areas); i.e. for such situations (involving a plurality of smaller service areas) a failure of the home database causes the public land mobile network not being able to process the call properly.

It is advantageous according to the present invention that in case of a failure of the functionality of the home database, the request for the information specific of the User Equipment by the requesting entity is provided such that a Send Routing Info (SRI) procedure, normally directed to the home database, is converted to a Provide Roaming Number (PRN) procedure and is directed to the visitor database.

Thereby, it is advantageously possible to effectively use the inventive method to provide at least in parts the requested network functionality.

According to the present invention, it is preferred that in case of a failure of the functionality of the home database, the result of the Provide Roaming Number (PRN) procedure is converted to a result of a Send Routing Info (SRI) procedure and delivered to the requesting entity.

According to the present invention, it is furthermore preferred that a verification is performed whether the mobile terminating call directed to the User Equipment can be routed within the one service area out of the plurality of service areas of the public land mobile network.

In an exemplary embodiment, the invention is described based primarily on a Universal Mobile Telecommunication System (UMTS) public land mobile network or a Global System of Mobile Communication (GSM) public land mobile network. However, the application of the present invention is not restricted to the use of a Global System of Mobile Communication (GSM) or Universal Mobile Telecommunication System (UMTS) public land mobile network. Therefore, for the case of a Global System of Mobile Communication (GSM) public land mobile network, it is preferred that:

the home database of the public land mobile network is a Home Location Register and/or wherein the visitor database of the one service area out of the plurality of service areas of the public land mobile network is a Visitor Location Register, and that the requesting entity of the one service area out of the plurality of service areas of the public land mobile network is a Mobile Switching Center (MSC) or a Gateway Mobile Switching Center (GMSC).

The present invention further relates to a public land mobile network for providing an emergency functionality while setting up a call directed to a User Equipment in the public land mobile network, the public land mobile network comprising a home database for permanently storing location and subscriber data concerning the User Equipment registered with the public land mobile network, the geographical coverage area of the public land mobile network being divided into a plurality of smaller service areas, wherein one such service area out of the plurality of service areas is served by a visitor database of the public land mobile network, wherein the visitor database is provided for temporarily storing subscriber data concerning the User Equipment currently located within the one service area out of the plurality of service areas, wherein the public land mobile network is provided such that in case of the occurrence of a mobile terminating call towards the User Equipment:

the home database is requested by a requesting entity to provide information specific of the User Equipment to the requesting entity, and wherein in case of a failure of the functionality of the home database, the requesting entity requests the visitor database for the information specific of the User Equipment.

The invention furthermore relates to a requesting entity, for providing an emergency functionality while setting up a call of a call directed to a User Equipment in a public land mobile network, the public land mobile network comprising a home database for permanently storing location and subscriber data concerning the User Equipment registered with the public land mobile network, the geographical coverage area of the public land mobile network being divided into a plurality of smaller service areas, wherein one such service area out of the plurality of service areas is served by a visitor database of the public land mobile network, wherein the visitor database is provided for temporarily storing subscriber data concerning the User Equipment currently located within the one service area out of the plurality of service areas, wherein the requesting entity is provided such that in case of the occurrence of a mobile terminating call towards the User Equipment:

the home database is requested by the requesting entity to provide information specific of the User Equipment to the requesting entity, and wherein in case of a failure of the functionality of the home database, the requesting entity requests the visitor database for the information specific of the User Equipment.

Furthermore, it is preferred according to the present invention that in case of a failure of the functionality of the home database, the request for the information specific of the User Equipment by the requesting entity is provided such that a Send Routing Info (SRI) procedure, normally directed to the home database, is converted to a Provide Roaming Number (PRN) procedure and is directed to the visitor database, and that in case of a failure of the functionality of the home database, the result of the Provide Roaming Number (PRN) procedure is converted to a result of a Send Routing Info (SRI) procedure and delivered to the requesting entity.

Additionally, the present invention relates to a program comprising a computer readable program code for executing an inventive method or for configuring or controlling an inventive requesting entity or an inventive public land mobile network.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, a cellular public land mobile network 10 is schematically represented. The coverage area of the public land mobile network 10 is divided in a plurality of smaller service areas, one of which is represented by means of a dashed circle and designated by reference sign 15'. Within such smaller service areas, the public land mobile network 10 comprises a plurality of network cells, i.e. radio coverage areas of the network, usually served one base station entity. For the one smaller service area 15' represented in FIG. 1, two exemplary network cells 15, 16 are represented schematically. Each of these network cells 15, 16 comprises a base station entity: for the network cell designated by reference sign 15, the corresponding base station entity is designated by the reference sign 20' and for the network cell designated by reference sign 16, the corresponding base station entity is designated by the reference sign 21'. The base station entities 20', 21' are fixed devices such as a NodeB or an eNodeB or the like, having each at least one antenna such that radio coverage within the cells 15, 16 is provided. Within the coverage area of the cell 15, a User Equipment 20 is schematically illustrated and within the coverage area of the cell 16, a User Equipment 21 is schematically illustrated. Usually, a network cell 15, 16 comprises a plurality of identical or different User Equipments.

The public land mobile network 10 comprises a home database 14. The one represented smaller service area 15' comprises a visitor database 11 and a requesting entity 12.

The present invention can be realized within public land mobile networks of different types. E.g. it is possible to use the inventive method
in a Global System of Mobile Communication (GSM) public land mobile network, or
in a Universal Mobile Telecommunication System (UMTS) public land mobile network. According to the different standards used, the terminology of different entities, parts or function of the public land mobile network usually differs.

When applied to a Global System of Mobile Communication (GSM) public land mobile network,
the User Equipments are usually called mobile stations or mobile devices;
the base station entity is usually called Base Transceiver Station or Base Station Controller;
the home database is usually called Home Location Register;
the smaller service area is usually called Location Area
the visitor database is usually called Visitor Location Register (VLR); and
the requesting entity is usually called Mobile Switching Center (MSC) or Gateway Mobile Switching Center (GMSC).

When applied to a Universal Mobile Telecommunication System (UMTS) public land mobile network,
the User Equipments are usually called User Equipments;
the base station entity is usually called NodeB;
the smaller service area is usually called Location Area;
the home database is usually called Home Location Register (HLR);
the visitor database is usually called Visitor Location Register (VLR); and
the requesting entity is usually called Mobile Switching Center (MSC) or Gateway Mobile Switching Center (GMSC).

According to the present invention, an emergency functionality of the public land mobile network is realized for the case that the home database 14 (hereinafter also called Home Location Register) is unavailable or experiences a failure or an outage. In this case and in a conventional public land mobile network 10 (i.e. without realizing the features of the present invention), all call scenarios which require information from the home database 14 will either not work at all or will have a reduced functionality level such as longer delay times or the like. E.g. for call setup purposes,
the originating Mobile Switching Center (MSC) requests information (as a requesting entity 12) by a Send Routing Info (SRI) procedure towards the home database 14 (or the Home Location Register);
the Home Location Register will provide a Provide Roaming Number (PRN) procedure towards the destination visitor database 11 (e.g. Visitor Location Register);
the Visitor Location Register will reply by a Provide Roaming Number (PRN) result, which will be converted by the Home Location Register (or home database 14) into a Send Routing Info (SRI) result;
the Send Routing Info (SRI) result will be sent back to the originating Mobile Switching Center (MSC).
The failure of the home database 14 (e.g. Home Location Register) would likely cause major negative impacts for subscribers that are registered with the public land mobile network 10, including:
most of the mobile terminated calls will be interrupted due to unsuccessful Home Location Register interrogation; and
authentication of subscriber activities will become impossible due to the inability to reach the Authentication Center (AUC).

To avoid this situation, the present invention provides a solution that allows for a call handling such that at least a part of the calls can be routed with in the public land mobile network despite the Home Location Register/Home Subscriber Server being unavailable. This is the case for those calls that either originate in the same smaller service area (e.g. location area) of the destination of the call. For such a situation, the Visitor Location Register or visitor database 11 comprises a set of information that is specific to the (destination) User Equipment 20 of the call to be routed or to be established. In case that the origin of the call to be routed to the (destination) User Equipment 20 is originated outside of the public land mobile network 10, the call can also be routed to the (destination) User Equipment 20 in case that the requesting entity corresponding to the User Equipment 20 is (by chance) also the gateway requesting entity corresponding to the network of origin of the call. This is represented in FIG. 1 by a further network 10'.

For the case of a Global System of Mobile Communication (GSM) public land mobile network 10, the requesting entity 12:
acts as a an Mobile Switching Center (MSC) regarding the (originating) User Equipment 21 (and its corresponding base station entity 21') being located within the (home) Location Area 15' of the (destination) User Equipment 20 (and its corresponding base station entity 20'); and
acts as a Gateway Mobile Switching Center (GMSC) regarding the (external) network 10' from where the call originates and also acts as a an Mobile Switching Center (MSC) regarding the (destination) User Equipment 20 (and its corresponding base station entity 20'), the external network 10' being for example another public land mobile network (of another network operator) in the same country or another public land mobile network abroad or a PSTN of the same or another country.

The home database can, e.g., be provided as a CNTDB (Common Network Technology Database) which stores all subscriber relevant data (and hence information specific to the User Equipments of the public land mobile network 10) for different applications like Home Location Register, Home Subscriber Server or the like.

Figure 2:
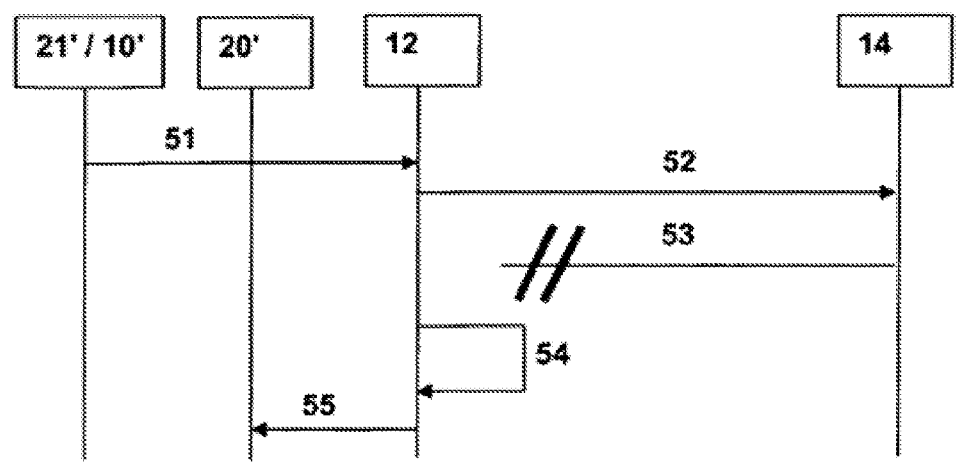
FIG. 2 schematically illustrates a communication diagram according to an exemplary embodiment.

According to an embodiment of the present invention, in order to avoid at least part of the aforementioned negative impact of a home database failure, the method as described in the following with respect to FIG. 2 is applied.

According to FIG. 2, the requesting entity 12 receives (either from an external network 10' or from a base station entity 21' corresponding to an originating User Equipment 21) in a first step 51 a message indicative of an incoming call towards a destination User Equipment 20.

In a second step 52, the requesting entity 12 requests from the home database 14 (or Home Location Register/Home Subscriber Server) a set of information specific of the destination User Equipment 20. Normally (i.e. without a failure with the home database 14), the home database 14 would return a Provide Roaming Number (PRN) result to the requesting entity 12 in a third step 53. However, in case of a failure of the home database 14, this third step will not occur (therefore, the arrow corresponding to the third step has been barred in FIG. 2). The requesting entity 12 waits for the response (third step 53) from the home database 14 but does not receive an answer. Therefore, after a certain period of time, a time out is generated within the requesting entity 12. According to the present invention, this time out event could trigger the emergency mode or could inform the operator to manually invoke the emergency mode of the requesting entity 12. This means that in a fourth step 54, the Send Routing Info (SRI) procedure towards the home database is converted into a Provide Roaming Number (PRN) procedure and is transmitted to the visitor database 11 (or the Visitor Location Register). This is possible in case that the originating and destination subscriber or User Equipment is served by the same visitor database 11 (because then the specific information related to the destination subscriber or destination User Equipment 20 is available (even without interrogation of the home database 14)). The Provide Roaming Number (PRN) result is preferably converted into a Send Routing Info (SRI) result and delivered (via a fifth step 55) to the destination base station entity 20'.

According to an alternative embodiment of the present invention, it is possible that in case that the information of the failure of the home database 14 can be made available to the requesting entity 12 (prior to the transmission attempt of the second step 52), the second step 52 (and hence the third step 53) is not performed at all (as it is then expected that this second step will result in a time out event).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for providing an emergency functionality when setting up a call directed to a User Equipment in a public land mobile network, the public land mobile network comprising a home database for permanently storing location and subscriber data concerning the User Equipment registered with the public land mobile network, the geographical coverage area of the public land mobile network being divided into a plurality of smaller service areas, wherein a first service area of the plurality of service areas is served by a visitor database of the public land mobile network, wherein the visitor database is provided for temporarily storing subscriber data concerning the User Equipment currently located within the first service area, the method comprising, in case of the occurrence of a mobile terminating call towards the User Equipment:
   requesting, by a requesting entity, that the home database provide information specific to the User Equipment to the requesting entity; and
   in case of a failure of the functionality of the home database, converting, by the requesting entity, a Send Routing Info (SRI) procedure adapted for the home database to a Provide Roaming Number (PRN) procedure directed to the visitor database; requesting, by the requesting entity, that the visitor database provide the information specific to the User Equipment; converting, by the requesting entity, a result of the PRN procedure to a result of an SRI procedure; and delivering the converted result to a destination base station entity.

2. The method according to claim 1, further comprising:
   verifying whether the mobile terminating call directed to the User Equipment can be routed within the first service area.

3. The method according to claim 1, wherein the home database of the public land mobile network is a Home Location Register.

4. The method according to claim 1, wherein the visitor database of the first service area is a Visitor Location Register.

5. The method according to claim 1, wherein the requesting entity of the first service is a Mobile Switching Center (MSC) or a Gateway Mobile Switching Center (GMSC).

6. A public land mobile network for providing an emergency functionality while setting up a call directed to a User Equipment in the public land mobile network, wherein the geographical coverage area of the public land mobile network is divided into a plurality of smaller service areas, the public land mobile network comprising:
   a home database for permanently storing location and subscriber data concerning the User Equipment registered with the public land mobile network;
   a visitor database for serving a first service area of the plurality of service areas and for temporarily storing subscriber data concerning the User Equipment, the User Equipment being currently located within the first service area; and a requesting entity, configured for, in case of the occurrence of a mobile terminating call towards the User Equipment:
   requesting that the home database provide information specific to the User Equipment to the requesting entity; and
   in case of a failure of the functionality of the home database, converting a Send Routing Info (SRI) procedure adapted for the home database to Provide Roaming Number (PRN) procedure directed to the visitor database; requesting that the visitor database provide the information specific to the User Equipment; converting a result of the PRN procedure to a result of an SRI procedure; and delivering the converted result to a destination base station entity.

7. A requesting entity for providing an emergency functionality while setting up a call of a call directed to a User Equipment in a public land mobile network, the public land mobile network comprising a home database for permanently storing location and subscriber data concerning the User Equipment registered with the public land mobile network, the geographical coverage area of the public land mobile network being divided into a plurality of smaller service areas, wherein a first service area of the plurality of service areas is served by a visitor database of the public land mobile network, wherein the visitor database is provided for temporarily storing subscriber data concerning the User Equipment currently located within the first service area, wherein the requesting entity is configured for, in case of the occurrence of a mobile terminating call towards the User Equipment:
   requesting that the home database provide information specific to the User Equipment to the requesting entity; and
   in case of a failure of the functionality of the home database, converting a Send Routing Info (SRI) procedure adapted for the home database to a Provide Roaming Number (PRN) procedure directed to the visitor database; requesting that the visitor database provide the information specific to the User Equipment; converting a result of the PRN procedure to a result of SRI procedure; and delivering the converted result to a destination base station entity.

8. The requesting entity according to claim 7, wherein the requesting entity is part of the first service area and is a Mobile Switching Center (MSC) or a Gateway Mobile Switching Center (GMSC).

9. A non-transitory computer-readable medium having computer-executable instructions stored thereon for providing an emergency functionality when setting up a call directed to a User Equipment in a public land mobile network, the public land mobile network comprising a home database for permanently storing location and subscriber data concerning the User Equipment registered with the public land mobile network, the geographical coverage area of the public land mobile network being divided into a plurality of smaller service areas, wherein a first service area of the plurality of service areas is served by a visitor database of the public land mobile network, wherein the visitor database is provided for temporarily storing subscriber data concerning the User Equipment currently located within the first service area, the computer-executable instructions, when executed by a processor, causing the following steps to be performed in case of the occurrence of a mobile terminating call towards the User Equipment:
   requesting that the home database provide information specific to the User Equipment to the requesting entity; and
   in case of a failure of the functionality of the home database, converting a Send Routing Info (SRI) procedure adapted for the home database to a Provide Roaming Number (PRN) procedure directed to the visitor database; requesting that the visitor database provide the information specific to the User Equipment; converting a result of the PRN procedure to a result of an SRI procedure; and delivering the converted result to a destination base station entity.

* * * * *